United States Patent [19]
Gamzon

[11] Patent Number: 5,074,489
[45] Date of Patent: Dec. 24, 1991

[54] METHOD AND SYSTEM FOR SUPPORTING AN AIRBORNE VEHICLE IN SPACE

[76] Inventor: Eliyahu Gamzon, 1a Hatsanchanim St., Rehovot, Israel

[21] Appl. No.: 415,734

[22] Filed: Oct. 2, 1989

[30] Foreign Application Priority Data

Mar. 3, 1989 [IL] Israel .................................. 89468

[51] Int. Cl.⁵ ............................................. B64C 37/02
[52] U.S. Cl. ......................................... 244/2; 244/26; 244/59; 244/114 R
[58] Field of Search ................. 244/2, 26, 158 R, 190, 244/189, 59, 62, 114 R

[56] References Cited

U.S. PATENT DOCUMENTS

| | | | |
|---|---|---|---|
| 1,181,784 | 5/1916 | McCurry | 244/2 |
| 2,373,086 | 4/1945 | Alabrune | 244/137.1 |
| 3,157,374 | 11/1964 | Conrey | 244/114 R |
| 3,173,634 | 3/1965 | Bary | 244/114 R |
| 3,434,678 | 3/1969 | Brown et al. | 244/158 R |
| 3,856,236 | 12/1974 | Doolittle | 244/2 |
| 4,482,110 | 11/1984 | Crimmins, Jr. | 244/26 |
| 4,697,761 | 11/1987 | Long | 244/62 |
| 4,799,629 | 1/1989 | Mori | 244/26 |
| 4,955,562 | 9/1990 | Martin et al. | 244/62 |

FOREIGN PATENT DOCUMENTS

2754114 7/1979 Fed. Rep. of Germany .
2951699 2/1982 Fed. Rep. of Germany .
909198 12/1945 France .
2141088 12/1984 United Kingdom .

OTHER PUBLICATIONS

1988 IEEE MTT International Microwave Symposium Digest vol. 1, 25 May 1988, New York pp. 283-286; J. J. Schlesack "A Microwave Powered High Altitude Platform".
NTIS Technotes: Dec. 1986; Springfield, Va., USA; p. 1299; K. D. Castle; "Wireless Jump Starts for Partly Disabled Equipment".

*Primary Examiner*—Joseph F. Peters, Jr.
*Assistant Examiner*—Anne E. Bidwell
*Attorney, Agent, or Firm*—Benjamin J. Barish

[57] ABSTRACT

A method and system for supporting an airborne vehicle in space over a predetermined location and for an extensive period, comprises coupling the airborne vehicle by cables to a plurality of unmanned aircraft each having its own propulsion system; controlling the unmanned aircraft to fly in circular orbits at equally-spaced angles around the airborne vehicle while coupled to the airborne vehicle, to tension the cables and thereby to support the airborne vehicle in space over the predetermined location; and supplying the unmanned aircraft with energy from an external source to maintain the unmanned aircraft in flight over an extended or indefinite period of time.

17 Claims, 2 Drawing Sheets

METHOD AND SYSTEM FOR SUPPORTING AN AIRBORNE VEHICLE IN SPACE

FIELD AND BACKGROUND OF THE INVENTION

The present invention relates to a method and a system for supporting an airborne vehicle in space. The invention is particularly applicable for hovering an airborne vehicle at an altitude of over 50,000 feet above sea level, and for extensive periods of time such as one month or longer, but the invention could also advantageously be used for supporting an airborne vehicle at much lower altitudes and/or for shorter periods of time.

There are many applications, both military and civilian, for hovering an airborne vehicle, e.g., a payload-carrying platform, in space over a predetermined location. High-altitude hovering (e.g., above 50,000 feet) is usually effected by geostationary satellites, but such systems are extremely expensive to produce and to launch. Low-altitude hovering may be effected by helicopters or balloons, but the period of time for such hovering, as well as the altitude, is very limited.

OBJECTS AND SUMMARY OF THE INVENTION

An object of the present invention is to provide a method and also a system of supporting an airborne vehicle in space, having advantages in the above respects.

The present invention provides a method of supporting an airborne vehicle in space over a predetermined location and for an extensive period, comprising: coupling the airborne vehicle by cables to a plurality of unmanned aircraft each having its own propulsion system; controlling the unmanned aircraft to fly in circular orbits at equally-spaced angles around the airborne vehicle while coupled to the airborne vehicle, to tension the cables and thereby to support the airborne vehicle in space over said predetermined location; supplying the airborne vehicle, while supported in space over said predetermined location, with energy from an external source; and transferring energy from said airborne vehicle to said unmanned aircraft to maintain the unmanned aircraft in flight over an extended or indefinite period of time.

In the described preferred embodiments, the unmanned aircraft are electrically propelled and are supplied with electrical energy from the external source. The electrical energy may be supplied from various sources, including: a microwave transmitter located on the ground, solar cells located on the airborne vehicle and transmitted to the unmanned aircraft via the cables, a power plant located on the ground and transmitting power to the airborne vehicle via a further cable, or a laser located on the ground.

Preferably, there are at least three, e.g. three-five, unmanned aircraft coupled to the airborne vehicle. The unmanned aircraft may support the airborne vehicle at an altitude of at least 50,000, preferably 60,000-100,000, feet above sea level.

The invention also provides a system for supporting an airborne vehicle in space over a predetermined location. The invention also provides a launching facility for launching the unmanned aircraft, the launching facility comprising a circular runway for the unmanned aircraft and a central bay for the airborne vehicle.

As will be more apparent from the description below, the method and system of the present invention is capable of supporting an airborne vehicle at any desired altitude in space, preferably between 60,000 and 100,000 feet above sea level, but less than 200,000 feet for indefinite periods of time so long as energy is supplied to the unmanned aircraft. Since the aircraft is unmanned, they do not need bulky cockpits, life support equipment, large propulsion systems, high-redundancy design, or other complicated controls. Preferably, the airborne vehicle is suspended below the orbit of the aircraft by means of cables coupling the aircraft to a rotating anchor point on the airborne vehicle. The unmanned aircraft should have very long wingspans of a laminar flow design and a high aspect ratio.

The method and system of the present invention are to be distinguished from aerial transporation techniques using a plurality of aircraft, such as described in Alabrune U.S. Pat. No. 2,298,912 of Oct. 13, 1942, Alabrune U.S. Pat. No. 2,373,086 of Apr. 10, 1945, and Wilson U.S. Pat. No. 4,416,436 of Nov. 22, 1983. In such techniques, two manned aircraft are used for pickup, transport and delivery of relatively heavy payloads. Since such systems are used mainly for delivering payloads from one location to another, they utilize manned aircraft flying at relatively low altitudes. In contrast, the method and system of the prevent invention are concerned with suspending a platform or other airborne vehicle in a fixed location for an extended period of time, and therefore use unmanned aircraft continuously supplied from an external source of energy and preferably hovering at a very high altitude, at least 50,000 feet above sea level.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
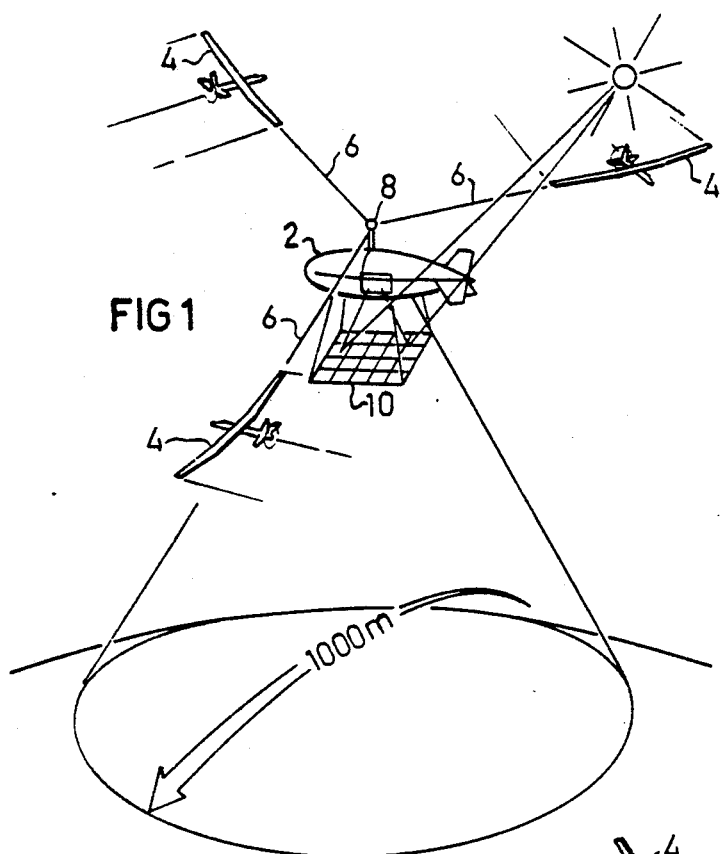
FIG. 1 illustrates one form of system constructed in accordance with the present invention for supporting an airborne vehicle in space over a predetermined location.

FIG. 1 illustrates an airborne vehicle 2 supported in space over a predetermined location by a plurality of unmanned aircraft 4 each connected to the airborne vehicle 2 by a cable 6 fixed at one end to the unmanned aircraft and at the opposite end to a rotating anchor 8 secured to the airborne vehicle 2. The plurality of unmanned aircraft 4 are externally controlled to fly in circular orbits at equally spaced angles around the airborne vehicle 2, so as to tension the cables 6 and thereby to support the airborne vehicle 2 in space over any desired predetermined location.

The aircraft 4, being unmanned, may be of very simple construction to exclude bulky cockpits, life support equipment, high redundancy design subsystems, and the like. These aircraft have long wing spans of laminar flow design and of a high aspect ratio. Their cable 6 may be coupled to the body of the aircraft or to the tips of their wings. Preferably three to five of such aircraft are used, depending on the payload.

The unmanned aircraft 4 preferably support the airborne vehicle 2 in suspension at an altitude of at least 50,000 feet, e.g. between 60,000 and 100,000 feet above sea level. The airborne vehicle can therefore serve many of the functions of a geostationary satellite but hovers at a substantially lower altitude and therefore covers substantially less ground area.

The unmanned aircraft 4 preferably include electrical propulsion systems which may be continuously supplied from external energy. FIG. 1 illustrates the externally-supplied energy being delivered from solar panels 10 supported by the airborne vehicle 2. These solar panels generate electricity which is supplied to the aircraft 4 via their cables 6, which serve as conduits for transmitting the electrical power, as well as flexible couplings for supporting the vehicle 2.

Figure 2:
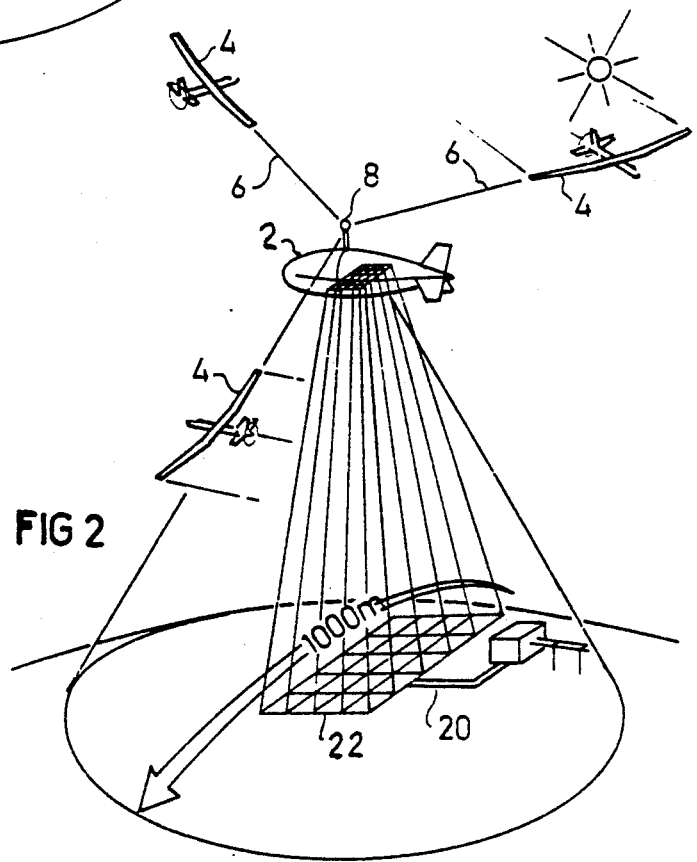
FIGS. 2 and 3 illustrate two other systems constructed in accordance with the present invention.

FIG. 2 illustrates a variation wherein the energy supplied to the unmanned aircraft 4 is derived from a microwave transmitter 20 located on the ground and transmitting the energy to a rectenna 22 supported by the airborne vehicle 2. The rectenna, namely a rectifying antenna, receives the transmitted microwave energy and converts it directly to DC, which energy is then fed via the cables 6 to the unmanned aircraft. The stability and fixed alignment of the rectenna requires neither a tracking ground antenna (moving and rotating so as to remain focussed on and polarized with the rectenna), nor a fixed spread beam with an unaligned polarity; this arrangement therefore provides a relatively simple means for transmitting the energy to the unmanned aircraft.

Microwave transmitter 20 may also be a high-power laser transmitting a narrow beam of laser energy to, and rectenna 22 may be a receiver for receiving the laser beam and for converting it to electrical energy supplied to the unmanned aircraft 4 via their cables 6.

Figure 3:
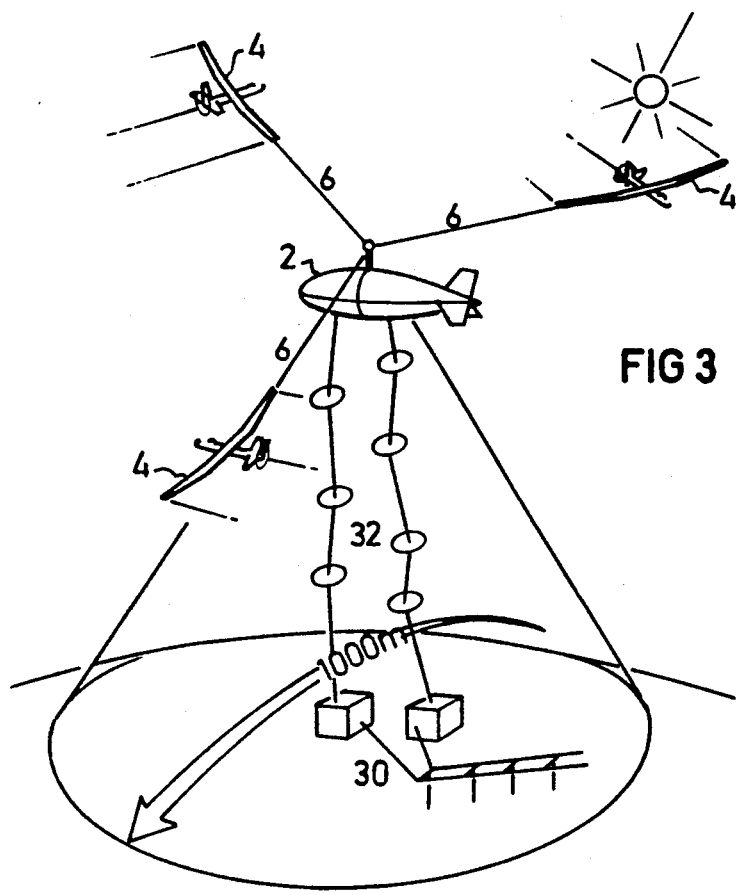

FIG. 3 illustrates another arrangement which may be used, in which the external electrical energy supplied to the unmanned aircraft 4 is derived from a power plant 30 located on the ground and connected to the airborne vehicle 2 by means of another cable 32. This technique is particularly useful when the airborne vehicle 2 is to hover at a relatively lower altitude, but calculations show that lightweight materials, which are presently available for use in constructing the cable 32, enable the power to be transmitted from a ground station 30 to an altitude of 50,000 feet or higher.

Figure 4:
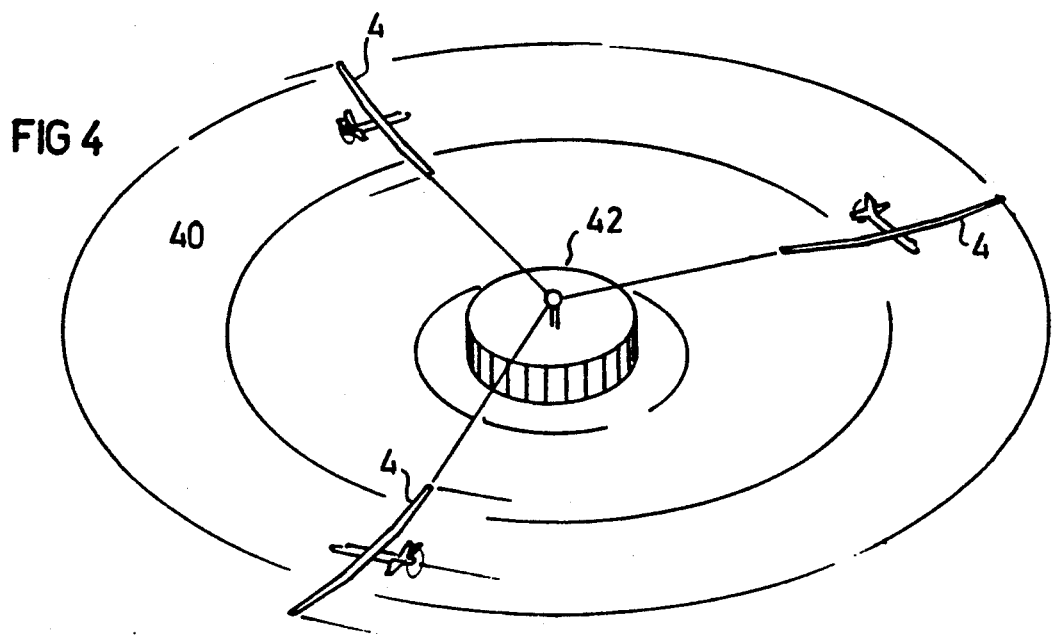
FIG. 4 illustrates a launching facility which may be used with any of the systems of FIGS. 1-3.

FIG. 4 illustrates a launching facility that may be used for launching the unmanned aircraft 4 and the airborne vehicle 2. Such a launching facility includes a circular runway 40 for the aircraft 4, and a central bay 42 for the airborne vehicle 2. All the aircraft take-off in synchronization, and trace a helical path in space as they ascend, the axis of the helical path being centered on the bay 42 for the airborne vehicle 2. The aircraft continue flying in this manner until the tension in all the cables 6 is sufficient to raise the airborne vehicle 2, and once airborne, the vehicle will climb and fly through the air in the same manner as a helicopter's rotor disc.

The power required for initial take-off may be provided by an auxiliary turbo-generator unit burning liquid fuel. When the unmanned aircraft 4 and the suspended airborne vehicle 2 reach a predetermined altitude, e.g., 40,000 feet, the turbo-generator unit and its fuel cell may be released and parachuted back to the ground. The vehicle then continues to fly and navigate until it reaches the required position, and once there, it hovers continuously correcting for all manners of drift.

Power for the operation of the airborne vehicle 2 and its payload, the vehicle avionics, and the aircraft propulsion systems after the release of the turbo-generator, is provided by an electrical power generator integrated into the airborne vehicle and using the energy supplied from the external sources, e.g., the solar panels 10 in FIG. 1, the ground-located microwave or laser transmitter 20 illustrated in FIG. 2, or the ground-located power plant 30 coupled to the airborne vehicle via a cable 32 as illustrated in FIG. 3. Each unmanned aircraft may thus be of simple and light-weight construction to include only its propulsion system and its wings. The supporting of the airborne vehicle may be further aided by a balloon secured to the airborne vehicle. The balloon may also include solar cells for generating electricity and for transmitting such generated electricity to the unmanned aircraft via the cables.

While the invention has been described with respect to several preferred embodiments, it will be appreciated that many other variations, modifications and applications of the invention may be made.

What is claimed is:

1. A method of supporting an airborne vehicle in space over a predetermined location and for an extensive period, comprising:
   coupling the airborne vehicle by cables to a plurality of unmanned aircraft each having its own propulsion system;
   controlling the unmanned aircraft to fly in circular orbits at equally-spaced angles around the airborne vehicle while coupled to the airborne vehicle, to tension the cables and thereby to support the airborne vehicle in spaced over said predetermined location;
   supplying the airborne vehicle, while supported in space over said predetermined location, with energy from an external source; and
   transferring energy from said airborne vehicle to said unmanned aircraft to maintain the unmanned aircraft in flight over an extended or indefinite period of time.

2. The method according to claim 1, wherein said unmanned aircraft are electrically propelled and are supplied with electrical energy from said external source.

3. The method according to claim 2, wherein said electrical energy is supplied to the airborne vehicle from a microwave transmitter located on the ground.

4. The method according to claim 2, wherein said electrical energy is supplied to the airborne vehicle from solar cells located on the airborne vehicle and transmitted to the unmanned aircraft via said cables.

5. The method according to claim 2, wherein said electrical energy is supplied to the airborne vehicle from a power plant located on the ground and transmitting power to the airborne vehicle via a further cable.

6. The method according to claim 2, wherein said electrical energy is supplied to the airborne vehicle from a laser located on the ground.

7. The method according to claim 1, wherein there are at least three of said unmanned aircraft coupled to said airborne vehicle.

8. The method according to claim 1, wherein the unmanned aircraft support the airborne vehicle at an altitude of at least 50,000 feet but less than 200,000 feet above sea level.

9. A launching facility for launching an airborne vehicle according to claim 1, comprising a circular runway for the unmanned aircraft, and a central bay for the airborne vehicle.

10. A system for supporting an airborne vehicle in space over a predetermined location and for an extensive period, comprising:
a plurality of unmanned aircraft, each coupled by a cable to the airborne vehicle;
control means for controlling the unmanned aircraft to fly a circular orbit at equally-spaced angles around the airborne vehicle while coupled thereto, to tension the cables and thereby to support the airborne vehicle in space over said predetermined location;
energy-supplying means supplying said airborne vehicle, while supported in space over said predetermined location, with energy from an external source; and
means for transferring energy from said airborne vehicle to said unmanned aircraft to maintain the unmanned aircraft in flight over an extended or indefinite period of time.

11. The system according to claim 10, wherein said unmanned aircraft include electrical propulsion devices and means for supplying said devices with electrical energy from said external source.

12. The system according to claim 11, wherein said means for supplying electrical energy comprises a microwave transmitter located on the ground.

13. The system according to claim 11, wherein said means for supplying electrical energy comprises solar cells located on the airborne vehicle for generating electrical energy transmitted to the unmanned aircraft via said cables.

14. The system according to claim 11, wherein said means for supplying electrical energy comprises a power plant located on the ground and supplying power to the airborne vehicle via a further cable.

15. The system according to claim 14, wherein said means for supplying electrical energy comprises a laser located on the ground.

16. The system according to claim 11, wherein there are at least three of said unmanned aircraft coupled to said airborne vehicle.

17. The system according to claim 11, further including a launching facility for launching said unmanned aircraft, comprising a circular runway for the unmanned aircraft, and a central bay for the airborne vehicle.

* * * * *